(12) United States Patent
Kuwabara et al.

(10) Patent No.: US 6,530,209 B2
(45) Date of Patent: Mar. 11, 2003

(54) THERMAL ENERGY REUSING SYSTEM

(75) Inventors: Kenichi Kuwabara, Abiko (JP);
Masaji Nagao, Tsuchiura (JP);
Toshihiro Asanuma, Chiyoda (JP);
Youichi Fujita, Tsukuba (JP); Yasuhide Mochimatsu, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/898,048

(22) Filed: Jul. 5, 2001

(65) Prior Publication Data

US 2002/0002828 A1 Jan. 10, 2002

(30) Foreign Application Priority Data

Jul. 10, 2000 (JP) ........................ 2000-207751

(51) Int. Cl.$^7$ ................................ F02C 7/00
(52) U.S. Cl. ................................ 60/39.511
(58) Field of Search .............. 60/39.511, 39.182, 60/39.41

(56) References Cited

U.S. PATENT DOCUMENTS 2,223,597 A * 12/1940 Brewster ................. 126/110 C
5,632,143 A * 5/1997 Fisher et al. ............. 60/39.181
6,430,914 B1 * 8/2002 Goidich et al. ............ 60/39.02

FOREIGN PATENT DOCUMENTS

| JP | 9-236201 | 9/1997 |
| JP | 9-287415 | 9/1997 |
| JP | 10-47078 | 2/1998 |
| JP | 10-196933 | 7/1998 |
| JP | 2000-45710 | 2/2000 |

* cited by examiner

Primary Examiner—Ehud Gartenberg
(74) Attorney, Agent, or Firm—Antonelli, Terry, Stout & Kraus, LLP

(57) ABSTRACT

In a system for reusing a thermal energy of an air discharged from a heated air source to heat a combustion air to be supplied into a combustion device so that the combustion air is mixed with a fuel to be combusted in the combustion device, an air feeder sucks the combustion air and feeds the combustion air toward the combustion device, an inlet passage at an upstream side of the air feeder passes the combustion air toward the air feeder, and the inlet passage includes a first inlet port for taking the air from the heated air source through the first inlet port into the inlet passage to incorporate the air to the combustion air and a second inlet port for taking an atmospheric air through the second inlet port into the inlet passage to incorporate the atmospheric air to the combustion air.

14 Claims, 4 Drawing Sheets

THERMAL ENERGY REUSING SYSTEM

BACKGROUND OF THE INVENTION

The present invention relates to a system for reusing a thermal energy of an air discharged from a heated air source to heat a combustion air to be supplied into a combustion device so that the combustion air is mixed with a fuel to be used for combustion in the combustion device.

JP-A-9-236201 discloses that a pressurized atmospheric air is mixed with an air discharged from a heated air source, and the mixture of the pressurized atmospheric air and the air discharged from the heated air source is supplied into a combustor. JP-A-10-196933 discloses that the air discharged from the heated air source is pressurized to be supplied into the combustor.

BRIEF SUMMARY OF THE INVENTION

An object of the present invention is to provide a system for reusing a thermal energy of an air discharged from a heated air source to heat a combustion air to be supplied into a combustion device so that the combustion air is mixed with a fuel to generate a high-temperature combustion gas by combusting the fuel with the combustion air in the combustion device, in which system, an air feeder for feeding the combustion air toward the combustion device is restrained from being damaged by the thermal energy of the air discharged from the heated air source, and/or the air can be effectively discharged from the heated air source even when a difference between an internal gaseous pressure in the heated air source and the atmospheric pressure is small.

In a system for reusing a thermal energy of an air discharged from a heated air source to heat a combustion air to be supplied into a combustion device so that the combustion air is mixed with a fuel to generate a high-temperature combustion gas by combusting the fuel with the combustion air in the combustion device, comprising, an air feeder for sucking the combustion air and urging the combustion air toward the combustion device, and an inlet passage arranged at an upstream side of the air feeder to allow the combustion air to flow toward the air feeder.

Since the inlet passage includes a first inlet port connected fluidly to the heated air source to take the air from the heated air source through the first inlet port into the inlet passage and a second inlet port connected fluidly to the atmosphere to take an atmospheric air from the atmosphere through the second inlet port into the inlet passage so that both the atmospheric air and the air discharged from the heated air source are incorporated to the combustion air to be fed into the combustion device through the air feeder, a temperature and pressure in the inlet passage arranged at the upstream side of the air feeder are kept small so that the air feeder is restrained from being damaged by the thermal energy of the air discharged from the heated air source, and/or the air can be effectively discharged from the heated air source even when a difference between an internal gaseous pressure in the heated air source and the atmospheric pressure is small.

When the air feeder is capable of making a gaseous pressure at the second inlet port less than the atmospheric pressure, the air can be more effectively discharged from the heated air source to the inlet passage even when the internal gaseous pressure in the heated air source is significantly small, and the atmospheric air can be more effectively taken to the inlet passage from the atmosphere.

The first inlet port may include a variable throttle for adjusting an opening area of the first inlet port, so that the air discharged from the heated air source is retrained or prevented from flowing into the inlet passage toward the air feeder, and/or a concentration or mass-flow-rate of oxygen in the combustion air is adjusted by changing a flow rate of the air discharged from the heated air source into the inlet passage. In this case, it is preferable for restraining an excessive heat of the inlet passage, particularly when the air discharged from the heated air source is substantially prevented from flowing through the inlet passage toward the air feeder, that the inlet passage further includes a third inlet port arranged at an upstream side of the variable throttle and opening to the atmosphere to allow the air from the heated air source to be discharged through the third inlet port to the atmosphere.

The second inlet port may include a variable throttle for adjusting an opening area of the second inlet port so that the atmospheric air is retrained from flowing into the inlet passage toward the air feeder and/or the concentration or mass-flow-rate of oxygen in the combustion air is adjusted by changing a flow rate of the atmospheric air flowing into the inlet passage.

The inlet passage may include a variable throttle for adjusting an opening area of the inlet passage to change a flow rate of the combustion air through the air feeder so that a fuel-air ratio in the combustion device is adjusted. In this case, it is preferable for correctly controlling a ratio between the fuel and the mass-flow-rate of oxygen for the combustion and restraining the variable throttle from being damaged by the thermal energy of the air discharged from the heated air source that the third variable throttle is arranged at a downstream side of he second inlet port.

The heated air source may include at least one of a gas turbine, a combustor and a combustion engine. The combustion device may include at least one of a gas turbine, a combustor and a combustion engine. The combustion device may include a combustor for combusting therein the fuel with the combustion air, a first heat exchanger for heating a fluid by a heat energy of the combustion gas, and a second heat exchanger for heating a water by the heated fluid.

When the air feeder is capable of making a gaseous pressure at a position at which the air and the atmospheric air join less than the atmospheric pressure, both the air and the atmospheric air can be effectively taken into the inlet passage and be effectively mixed or agitated with each other.

When a bypass passage includes an inlet port opening to the inlet passage at a downstream side of the first inlet port and at an upstream side of the second inlet port to allow at least a part of the air to flow into the bypass passage while the atmospheric air is restrained from flowing into the bypass passage, and an outlet port for allowing the at least a part of the air therethrough to be joined with the combustion gas after the combustion gas is generated by combusting the fuel with the combustion air supplied through the air feeder, that is, at a downstream side of a combusting position at which the fuel and the combustion air join to combust the fuel with the combustion air, a flow rate of the air discharged from the heated air source, a thermal energy of which air is utilized, is increased while the fuel-air ratio or the concentration or mass-flow-rate of oxygen in the combustion air is correctly adjusted, so that a part of the thermal energy of the air discharged from the heated air source to be discharged to the atmosphere is decreased.

If the air feeder is operable to feed the atmospheric air from the second inlet port into the combustion device when the air discharged from the heated air source flows into the inlet passage and the fuel is prevented from being combusted with the combustion air in the combustion device, an excessive heat and/or dew condensation in the inlet passage, the air feeder or the combustion device is restrained by the atmospheric air.

It is preferable for restraining the excessive heat and/or dew condensation in the inlet passage, the air feeder or the combustion device that the second variable throttle is openable to take the atmospheric air into the inlet passage when the air is taken from the heated air source through the first inlet port into the inlet passage.

DETAILED DESCRIPTION OF THE INVENTION

Figure 1:
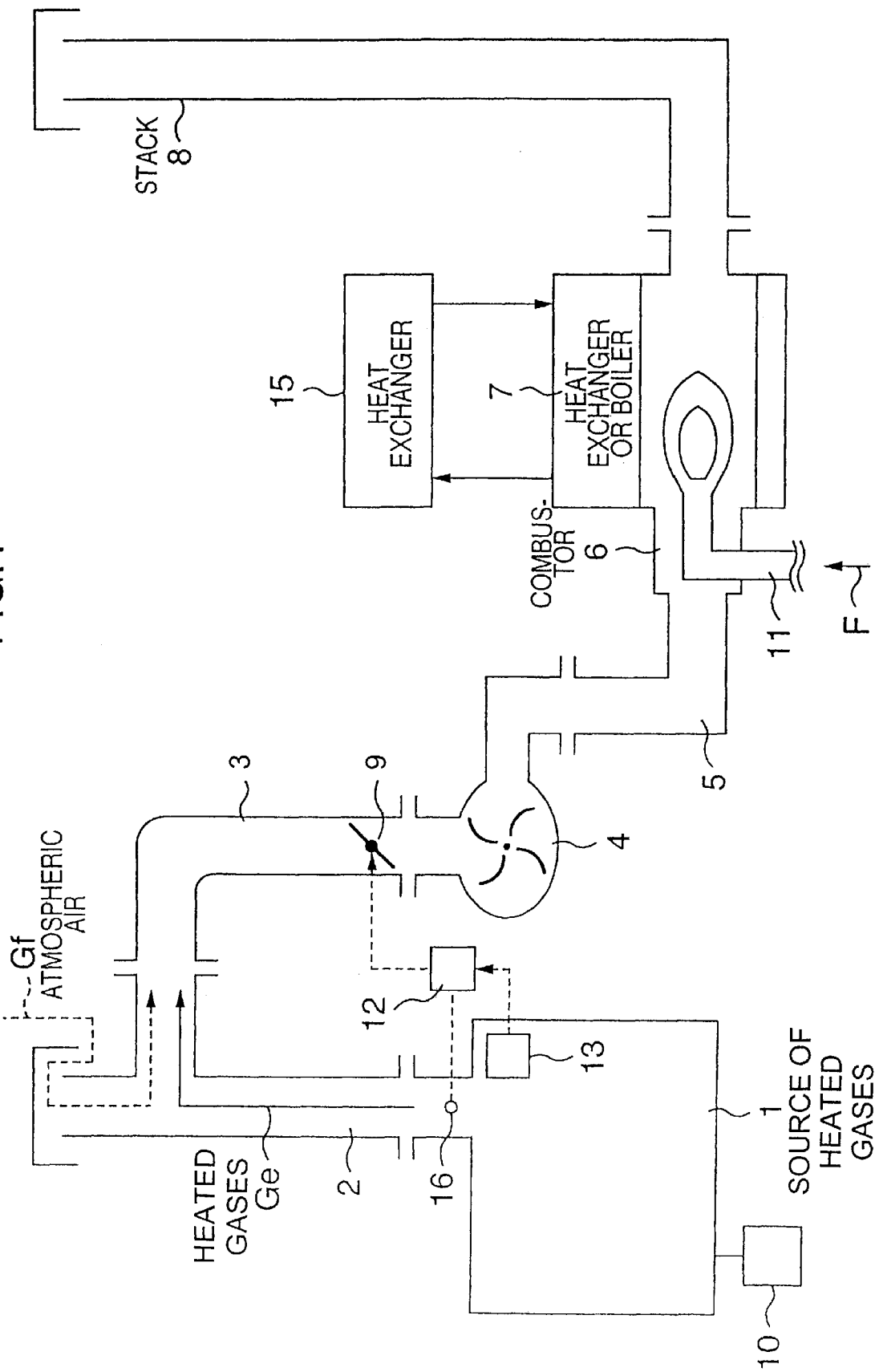
FIG. 1 is a schematic view showing a thermal energy reusing system of a first embodiment of the invention.

In a thermal energy reusing system as shown in FIG. 1, a thermal energy of an air discharged from a heated air source (gas turbine for driving, for example, an electric generator, combustor or combustion engine) 1 is utilized. A first discharged air duct 2 is connected fluidly to an air outlet of the heated air source 1, an end of a first combustion air duct 3 is fluidly connected to the first discharged air duct 2, another end of the first combustion air duct 3 is fluidly connected to a combustion air inlet or upstream port of an air feeder or fan 4 for supplying a pressurized combustion air, an combustion air outlet or downstream port of the air feeder 4 is connected fluidly to an end of a second combustion air duct 5, another end of the second combustion air duct 5 is fluidly connected to a combustion air inlet port of a combustor 6, a high-temperature combustion gas discharged from the combustor 6 is introduced into a heat exchanger or boiler 7, and an air discharged from the boiler 7 is discharged to the atmosphere through a discharge duct 8.

An air Ge discharged from the heated air source 1 through the first discharged air duct 2 is sucked to the first combustion air duct 3 by the air feeder 4 while an atmospheric air Gf is sucked through an opened end of the first discharged air duct 2 into the first combustion air duct 3 by the air feeder 4 to be mixed with the air Ge. A pressure of the air Ge at the air outlet of the heated air source 1 is higher than the atmospheric pressure, and a pressure at which the air Ge and the atmospheric air Gf join is lower than the atmospheric pressure. The pressure at which the air Ge and the atmospheric air Gf join is determined in accordance with a suction pressure of the air feeder 4 adjustable by a fan rotational speed of the air feeder 4, and is adjustable in accordance with an opening area of a flow rate control valve 9 at an upstream side of the air feeder 4 in the first combustion air duct 3. A difference between the pressure of the air Ge at the air outlet of the heated air source 1 and the pressure at which the air Ge and the atmospheric air Gf join and a difference between the atmospheric pressure and the pressure at which the air Ge and the atmospheric air Gf join are set in such a manner that an appropriate flow rate of each of the air Ge and the atmospheric air Gf is supplied to the combustor 6. The flow rate control valve 9 may be controlled in accordance with a condition of the air discharged from the heated air source 1 by a controller 12 while the condition of the air discharged from the heated air source 1 is measured by a sensor 16 so that the opening area of the flow rate control valve 9 is adjusted.

The combustion air as a combination of the air Ge and the atmospheric air Gf is pressurized by the air feeder 4 to be fed into the combustor 6 through the second combustion air duct 5. In the combustor 6, the combustion air is mixed with a fuel F supplied into the combustor 6 through a fuel passage 11 so that the fuel F is conbusted. A thermal energy of the heated gas discharged from the combustor 6 is used as a thermal energy source of the heat exchanger or boiler 7, and the thermal energy absorbed by the heat exchanger or boiler 7 is used to regenerate a refrigerant of an absorption type heat exchanger 15.

Since a temperature of the combustion air as the combination of the air Ge and the atmospheric air Gf is decreased by the atmospheric air Gf, the air feeder 4 is restrained from being damaged by the temperature of the combustion air.

Figure 2:
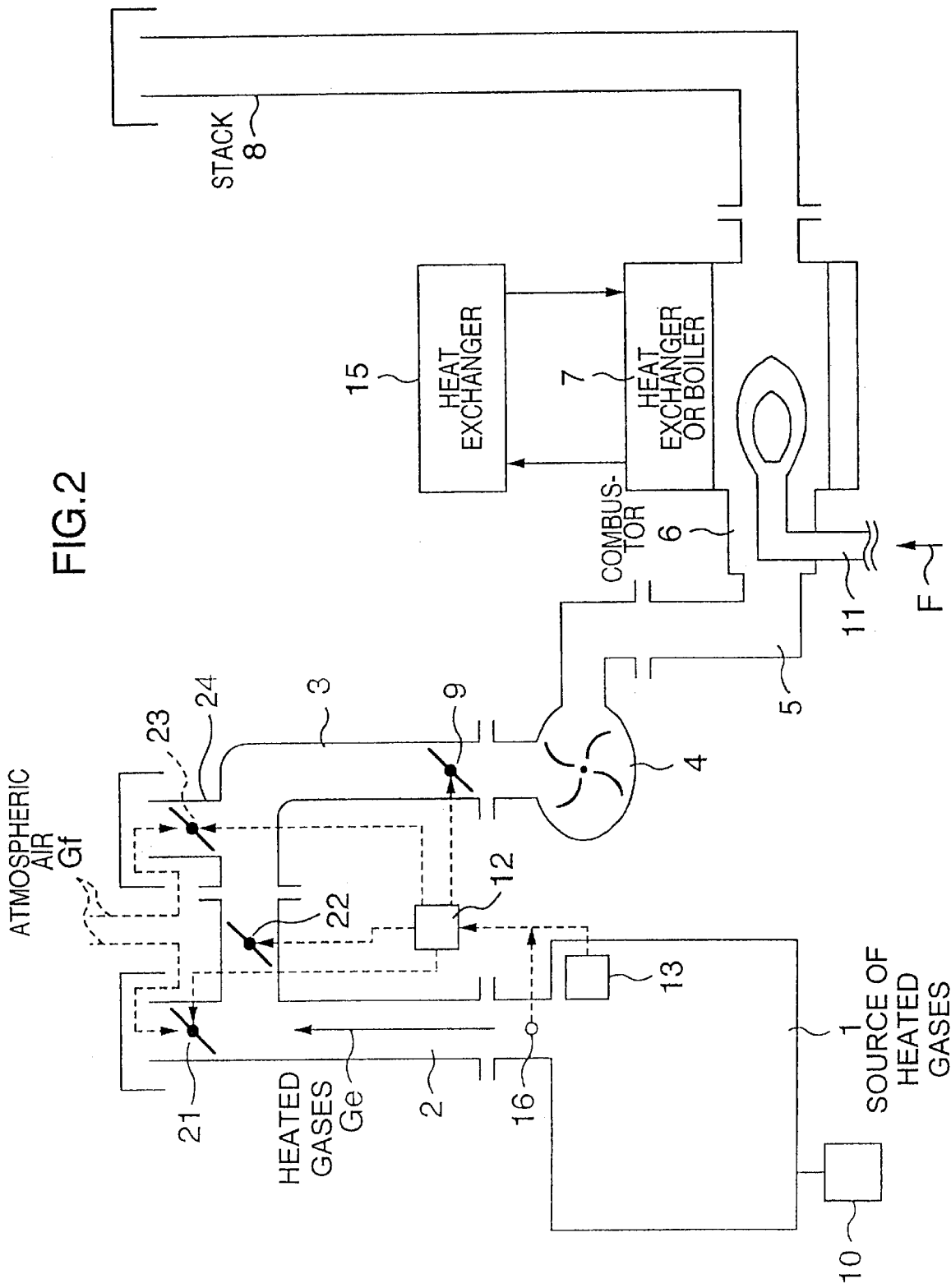
FIG. 2 is a schematic view showing a thermal energy reusing system of a second embodiment of the invention.

In another thermal energy reusing system as shown in FIG. 2, an inlet port of the atmospheric air Gf at the opened end of the first discharged air duct 2 has a flow control valve 21, a flow control valve 22 is arranged to control the flow rate of the mixture of the air Ge and the atmospheric air Gf after the air Ge and the atmospheric air Gf join, another inlet port 24 of the atmospheric air Gf at a downstream side of the flow control valve 22 has a flow control valve 23 to control a flow rate of the atmospheric air Gf to be taken into the first combustion air duct 3 through the another inlet port 24 as the combustion air.

By controlling the flow control valve 21, a ratio in flow rate between the air Ge and the atmospheric air Gf in the combustion air is adjusted in accordance with the condition of the air Ge measured by a heated air source condition sensor 13 and/or the gas condition sensor 16. The controller 12 calculates a preferable flow rate of the combustion air to be supplied to the combustor 6 on the basis of the condition of the air Ge, and controls opening areas of the flow control valves 21, 23 and 9.

Therefore, a combustion condition of the combustor 6 is kept preferable even when an operating condition of the heated air source 1 varies. Further, a flow rate of the atmospheric air Gf can be minimized in accordance with a concentration of Oxygen in the air Ge discharged from the heated air source 1 to effectively utilize the air discharged from the heated air source 1.

If it is necessary for the air Ge discharged from the heated air source 1 to be prevented from being used in the combustion air, the flow control valve 22 prevents a fluidal communication between the first combustion air duct 3 and the first discharged air duct 2. In this case, the atmospheric air Gf is supplied from the another inlet port 24 to the combustor 6 while the flow control valve 23 controls the flow rate of the atmospheric air Gf to be supplied to the combustor 6 in accordance with a requirement from the combustor 6.

Figure 3:
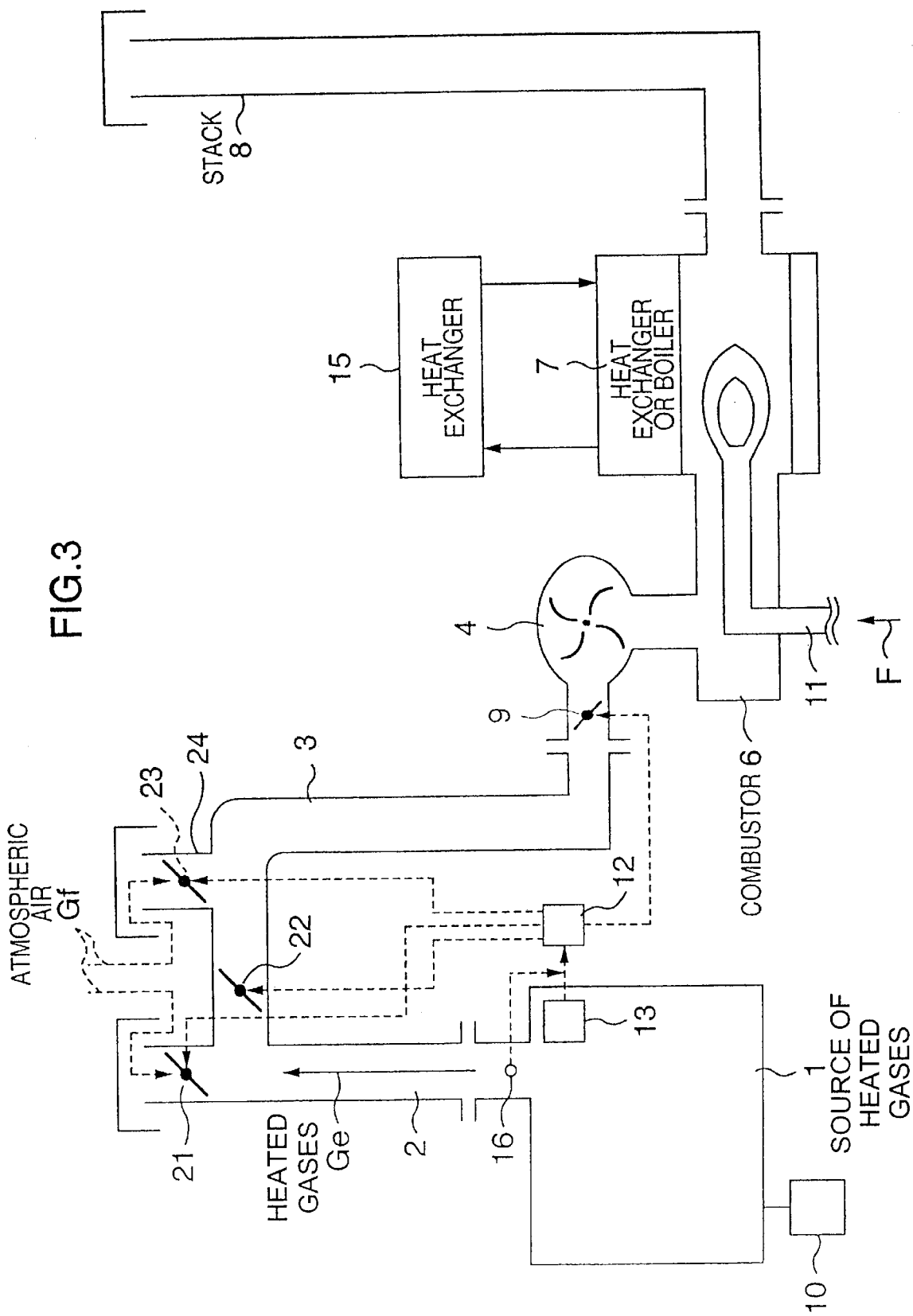
FIG. 3 is a schematic view showing a thermal energy reusing system of a third embodiment of the invention.

In another thermal energy reusing system as shown in FIG. 3, the air feeder 4 is directly connected to the combustor 6 to eliminate the second combustion air duct 5.

Figure 4:
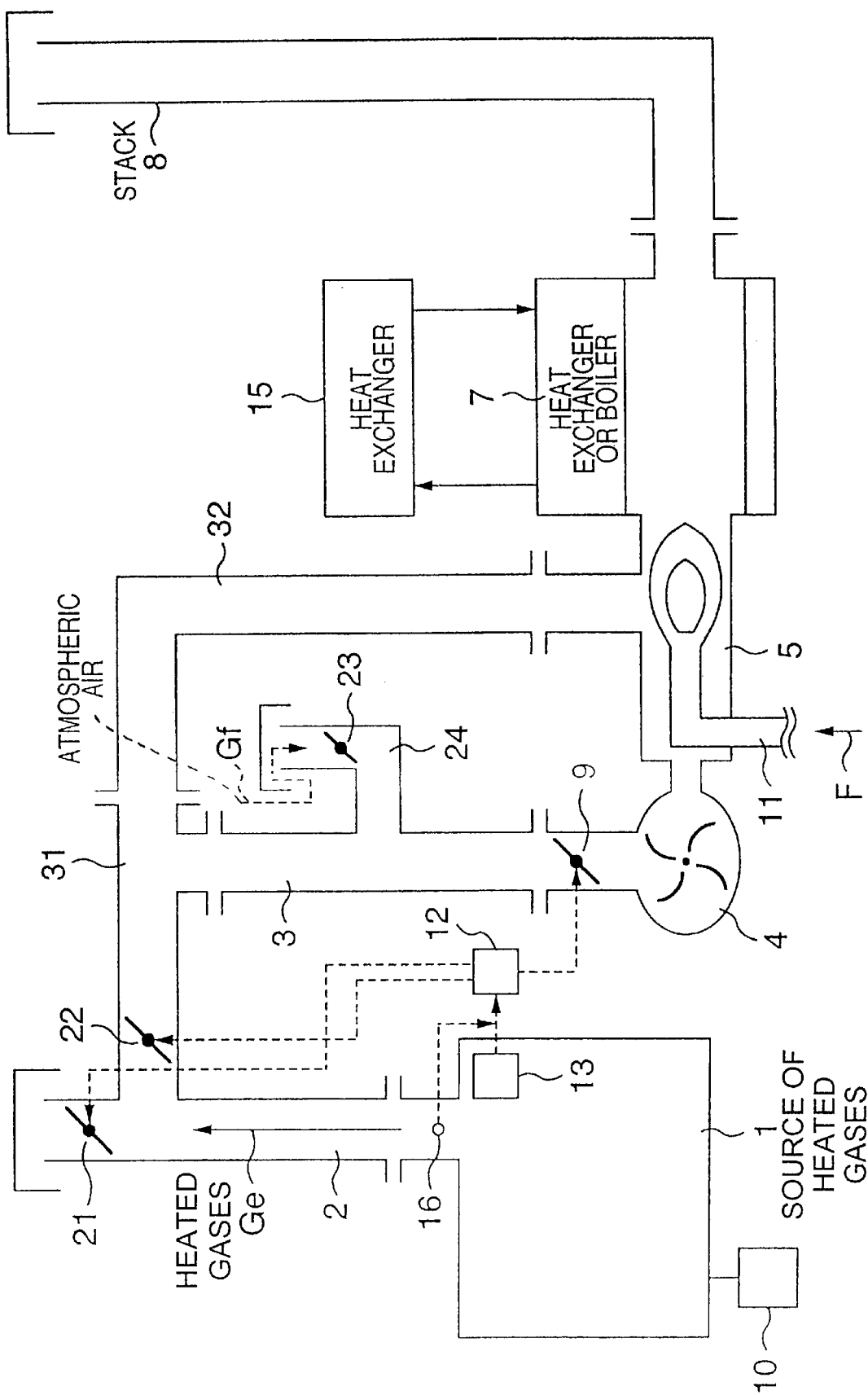
FIG. 4 is a schematic view showing a thermal energy reusing system of a fourth embodiment of the invention.

In another thermal energy reusing system as shown in FIG. 4, an end of a bypass duct 32 is connected to the first combustion air duct 3 at an joint 31 of an upstream side of the another inlet port 24, and another end thereof is opens to a combustion gas flow generated by combusting the fuel F with the combustion air supplied through the first combustion air duct 3 by the air feeder 4. When the thermal energy of the air Ge discharged from the heated air source 1 is utilized, the flow control valve 22 is opened and the flow control valve 21 is closed. The air Ge flows through the joint 31 in each of the first combustion air duct 3 and the bypass duct 32.

The combustion air whose flow rate is controlled by the flow control valve 9 in accordance with a mass flow rate of oxygen required in the combustor 9 is supplied into the combustor 6 to combust the fuel F. The air Ge also flows from the bypass duct 32 into the combustor 6 to be combined with the combustion gas generated by combusting the fuel F with the combustion air supplied through the first combustion air duct 3 by the air feeder 4.

When the thermal energy of the gas Ge is not utilized to heat the combustion air although the heated air source 1 generates the gas Ge, the flow control valve 21 is opened and the flow control valve 22 is closed to discharge the gas Ge to the atmosphere through the flow control valve 21. Under this circumstance, even when the combustor 6 is not operated to combust the fuel, the air feeder 4 is operated to feed the atmospheric air Gf from the another inlet port 24 into the combustor 6 so that a humidity and temperature in the first combustion air duct 3, the air feeder 4, the combustor 6 and the heat exchanger or boiler 7 are decreased, because if a leakage of the gas Ge through the flow control valve 22 causes an excessive heat and/or dew condensation in the first combustion air duct 3, the air feeder 4, the combustor 6 and the heat exchanger or boiler 7.

What is claimed is:

1. A system for reusing a thermal energy of an air discharged from a heated air source to heat a combustion air to be supplied into a combustion device so that the combustion air is joined with a fuel to generate a high-temperature combustion gas by combusting the fuel with the combustion air in the combustion device, comprising, an air feeder for sucking the combustion air and urging the combustion air toward the combustion device, and an inlet passage arranged at an upstream side of the air feeder to allow the combustion air to flow toward the air feeder, wherein the inlet passage includes a first inlet port connected fluidly to the heated air source to take the air from the heated air source through the first inlet port into the inlet passage so that the air is incorporated to the combustion air and a second inlet port connected fluidly to the atmosphere to take an atmospheric air from the atmosphere through the second inlet port into the inlet passage so that the atmospheric air is incorporated to the combustion air.

2. A system according to claim 1, wherein the air feeder is capable of making a gaseous pressure at the second inlet port less than the atmospheric pressure.

3. A system according to claim 1, wherein the first inlet port includes a variable throttle for adjusting an opening area of the first inlet port.

4. A system according to claim 3, wherein the inlet passage further includes a third inlet port arranged at an upstream side of the variable throttle and opening to the atmosphere to allow the air from the heated air source to be discharged through the third inlet port to the atmosphere.

5. A system according to claim 1, wherein the second inlet port includes a variable throttle for adjusting an opening area of the second inlet port.

6. A system according to claim 1, wherein the inlet passage includes a third variable throttle for adjusting an opening area of the inlet passage to change a flow rate of the combustion air toward the air feeder.

7. A system according to claim 6, wherein the third variable throttle is arranged at a downstream side of the second inlet port.

8. A system according to claim 1, wherein the heated air source includes at least one of a gas turbine, a combustor and a combustion engine.

9. A system according to claim 1, wherein the combustion device includes at least one of a gas turbine, a combustor and a combustion engine.

10. A system according to claim 1, wherein the combustion device includes a combustor for combusting therein the fuel with the combustion air, a first heat exchanger for heating a fluid by a heat energy of the combustion gas, and a second heat exchanger for heating a water by the heated fluid.

11. A system according to claim 1, wherein the air feeder is capable of making a gaseous pressure at a position at which the air discharged from the heated air source and the atmospheric air join less than the atmospheric pressure.

12. A system according to claim 1, further comprising a bypass passage including an inlet port opening to the inlet passage at a downstream side of the first inlet port and at an upstream side of the second inlet port to allow at least a part of the air discharged from the heated air source to flow into the bypass passage while the atmospheric air is restrained from flowing into the bypass passage, and an outlet port for allowing the at least a part of the air therethrough to be joined with the combustion gas after the combustion gas is generated by combusting the fuel with the combustion air supplied through the air feeder.

13. A system according to claim 1, wherein the air feeder is operable to feed the atmospheric air from the second inlet port into the combustion device when the air is discharged from the heated air source and the fuel is prevented from being combusted with the combustion air in the combustion device.

14. A system according to claim 1, wherein the second inlet port includes a second variable throttle for adjusting an opening area of the second inlet port, and the second variable throttle is openable to take the atmospheric air into the inlet passage when the air is taken from the heated air source through the first inlet port into the inlet passage.

* * * * *